United States Patent
Kim

(10) Patent No.: US 6,615,948 B2
(45) Date of Patent: Sep. 9, 2003

(54) REPELLING FORCE APPARATUS OF POWER STEERING SYSTEM FOR VEHICLE

(75) Inventor: Jae-Deok Kim, Wonjoo (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 09/734,430

(22) Filed: Dec. 11, 2000

(65) Prior Publication Data

US 2002/0063013 A1 May 30, 2002

(30) Foreign Application Priority Data

Nov. 28, 2000 (KR) ........................................ 2000-71193

(51) Int. Cl.[7] .............................. B62D 5/04; H02K 1/06
(52) U.S. Cl. ...................................... 180/444; 310/40 R
(58) Field of Search ............................... 180/443–444, 180/421–423; 310/40 R

(56) References Cited

U.S. PATENT DOCUMENTS 4,886,137 A * 12/1989 Pawlak et al. .............. 180/423
4,886,138 A * 12/1989 Graber et al. ............... 180/423
5,119,898 A *  6/1992 Eckhardt et al. ............ 180/422
5,412,530 A *  5/1995 Shimizu ..................... 180/422

* cited by examiner

Primary Examiner—Kevin Hurley
Assistant Examiner—Matthew Luby
(74) Attorney, Agent, or Firm—R. Neil Sudol; William J. Sapone; Henry D. Coleman

(57) ABSTRACT

The present invention relates to a repelling force apparatus of a power steering system for a vehicle which is capable of obtaining various type linear and/or non-linear characteristics in a state that the characteristic of a valve is varied based on a running speed of a vehicle. There is provided a repelling force apparatus of a power steering system for a vehicle in which the teeth formed in a pair of the rotational ferromagnetic members are formed in a trapezoid shape, and the sizes of the opposite surfaces of the same are different in the repelling force apparatus of a power steering system for a vehicle having a plurality of teeth which are opposite each other based on 1:1 in a pair of rotational ferromagnetic members wherein there are provided an exciting coil, a permanent magnet and a pair of rotational ferromagnetic members.

9 Claims, 12 Drawing Sheets

PRIOR ART

PRIOR ART

PRIOR ART

PRIOR ART

PRIOR ART

PRIOR ART

REPELLING FORCE APPARATUS OF POWER STEERING SYSTEM FOR VEHICLE

BACKGROUND OF THE INVENTION

1. Field of the Invention

The present invention relates to a repelling force apparatus of a power steering system for a vehicle, and in particular to a repelling force apparatus of a power steering system for a vehicle which is capable of increasing a steering force for thereby generating a certain difference in an operation force of a steering handle based on a running speed of a vehicle.

2. Description of the Background Art

Generally, in a hydraulic pressure steeling system which generates a steering force using a hydraulic operator, an output shaft and steering handle which are connected with steering wheels are connected on the same axis. Therefore, in the case that a steering torque is applied to the steering handle, a certain relative variation occurs between an input shaft and an output shaft based on a torsion of a torsion bar, so that a certain oil is applied to an operation chamber corresponding to a direction of a steering torque by a rotary valve between an input shaft and a valve body based on the relative variation.

As shown in FIG. 1, an interrelationship between a steering torque applied to the steering handle and a steering sub-force generated by a hydraulic operator is determined based on a torsion characteristic of the torsion bar, so that as the variation is increased, the amount of the torque is increased. Therefore, since the variation of the hydraulic pressure with respect to the steering torque needs a large hydraulic pressure in the case that a vehicle is stopped and runs at a low speed, the characteristic of an interval "a" is used, and in the case that the vehicle runs at an intermediate speed and high speed, since it is possible to steer using a small hydraulic pressure, the characteristic of an interval "b" in which a small hydraulic pressure is used is used.

However, when setting the value of the torque of the steering handle based on a stop or low speed running state with respect to the variation of the hydraulic pressure based on the variation of the torque, it is possible to steer using a very small torque in the case that the vehicle runs at a high speed, so that an instable state occurs in a straight drive. On the contrary, when setting the value of the torque of the steering handle to a large value based on an intermediate or high speed running state, it is impossible to obtain enough steering sub-force.

Therefore, in the case that the vehicle is stopped or runs at a low speed by changing the slope of a variation graph of a torque with respect to a torsion variation of a torsion bar and a hydraulic pressure with respect to the torque in accordance with a running speed of the vehicle, a steering sub-force is increased using a small torque of the steering handle. In the case that the vehicle runs at an intermediate speed or high speed, a repelling force apparatus capable of increasing a steering repelling force is used.

A repelling force apparatus using an electric magnetic force is widely used for the above-described repelling force apparatus. The repelling force apparatus which uses the electric magnetic force is disclosed in the U.S. Pat. No. 5,119,898. In the above U.S. Pat. No. 5,119,898, a capsule type exciting coil 130, a cylindrical permanent magnet ring 104 and a pair of cylindrical ferromagnetic members 106 and 108. The cylindrical permanent magnetic ring 104 is fixed to a hub of a rotor installed at an outer portion of a sleeve for a revolution with respect to a valve body. In addition, the cylindrical rotation ferromagnetic members 106 and 108 are fixed at an inner portion of a spool shaft for a rotation together with the spool shaft.

The cylindrical permanent magnetic ring 104 is extended in an axial direction, so that the magnetic poles are alternately formed in a radial direction. FIGS. 4A and 4B are views of a flow of a magnetic field of a rotary magnetic circuit in a conventional repelling force apparatus.

In a state that a steering operation force is not applied to a steering handle, the path of the magnetic flow is formed in a central alignment as shown in FIG. 4A. However, when a steering operation force is applied to the steering handle, the cylindrical permanent magnet ring 104 is rotated based on the rotation of the valve body, so that the center of the magnetic flow path is distorted as shown in FIG. 4B.

In the thusly distorted magnetic flow path, the cylindrical permanent magnet ring 104 has a characteristic to be moved to the original position by the central alignment recovering force. The above-described force is applied as a repelling force with respect to the steering sub-force. Therefore, it is possible to adjust the steering sub-force based on a magnetic field by adjusting an intensity of the central alignment recovering force generated by the capsule type exciting coil 130.

As shown in FIGS. 5A and 5B, the toothed portions 120 and 122 formed in the cylindrical rotational ferromagnetic members 106 and 108 are protruded in a rectangular shape and are opposite to each other. Therefore, in the operational force variation by the magnetic force, as shown in FIG. 6, a straight line increase is implemented compared to the basic characteristic of the torsion bar. Therefore, as shown in FIG. 7, as a certain torque is generated by rotating the steering handle, in the case that the characteristic of the valve does not have a non-sensitive portion in which the pressure of the value is generated, it is possible to obtain a variable characteristic of the pressure-to-torque.

However, as shown in FIG. 8, in the case that there is a non-sensitive portion in which there is not a variation in the pressure of the valve even when the torque is generated by rotating the steering handle, as shown in FIG. 9, the non-sensitive portion of the valve characteristic is increased by a linear increase of the torque based on the torque generated by the variation of the torsion bar which is varied in accordance with the rotational angle of the steering handle.

SUMMARY OF THE INVENTION

Accordingly, it is an object of the present invention to provide a repelling force apparatus of a power steering system for a vehicle which is capable of obtaining various type linear and/or non-linear characteristics in a state that the characteristic of a valve is varied based on a running speed of a vehicle.

To achieve the above object, there is provided a repelling force apparatus of a power steering system for a vehicle in which the teeth formed in a pair of the rotational ferromagnetic members are formed in a trapezoid shape, and the sizes of the opposite surfaces of the same are different in the repelling force apparatus of a power steering system for a vehicle having a plurality of teeth which are opposite each other based on 1:1 in a pair of rotational ferromagnetic members wherein there are provided an exciting coil, a permanent magnet and a pair of rotational ferromagnetic members.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The repelling force apparatus of a power steering system for a vehicle according to the present invention will be explained with reference to FIGS. 10 through 15.

Figure 1:
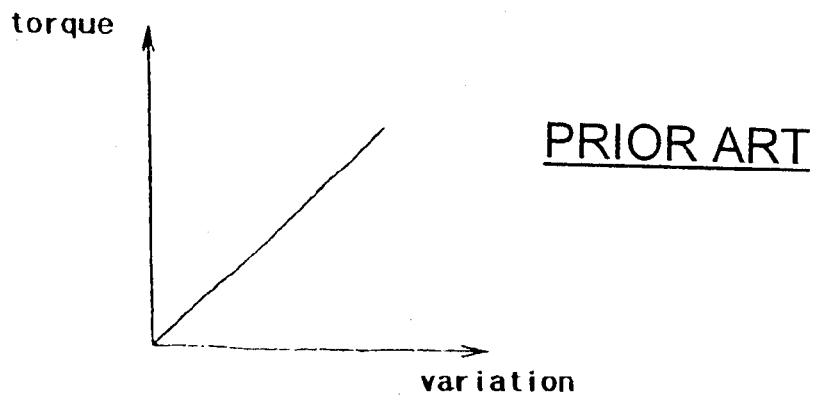
FIG. 1 is a view illustrating a torsion characteristic with respect to a steeling torque in a conventional art.
Figure 2:
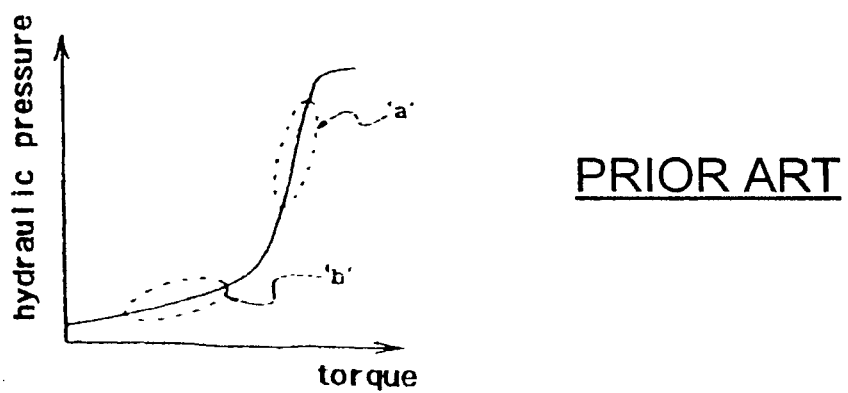
FIG. 2 is a view illustrating a variation of a hydraulic variation with respect to a steeling torque in a conventional art.
Figure 3:
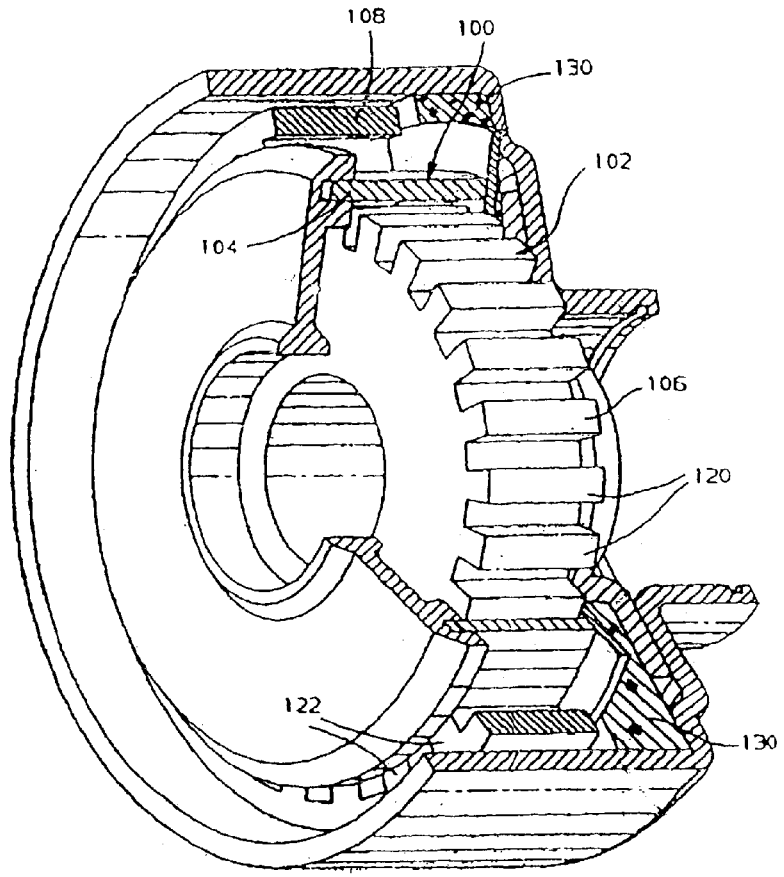
FIG. 3 is a partially cut-away perspective view illustrating a construction of a conventional repelling force apparatus.
Figure 4A:
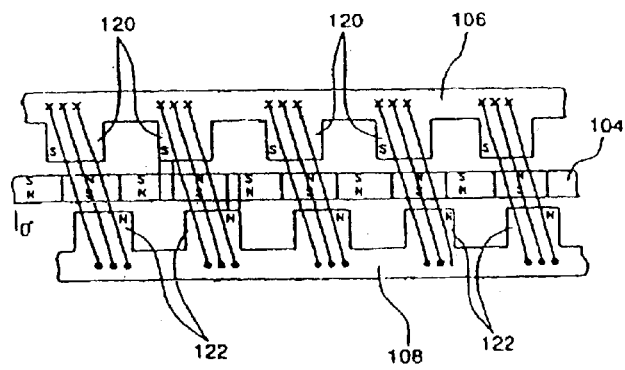
FIGS. 4A and 4B are views of a flow of a magnetic field of a rotary magnetic circuit in a conventional repelling force apparatus.
Figure 4B:
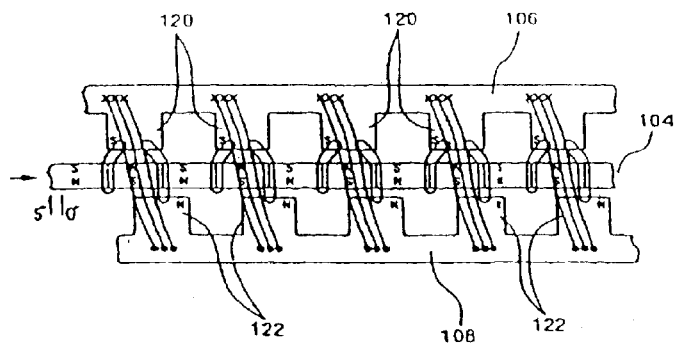
Figure 5A:
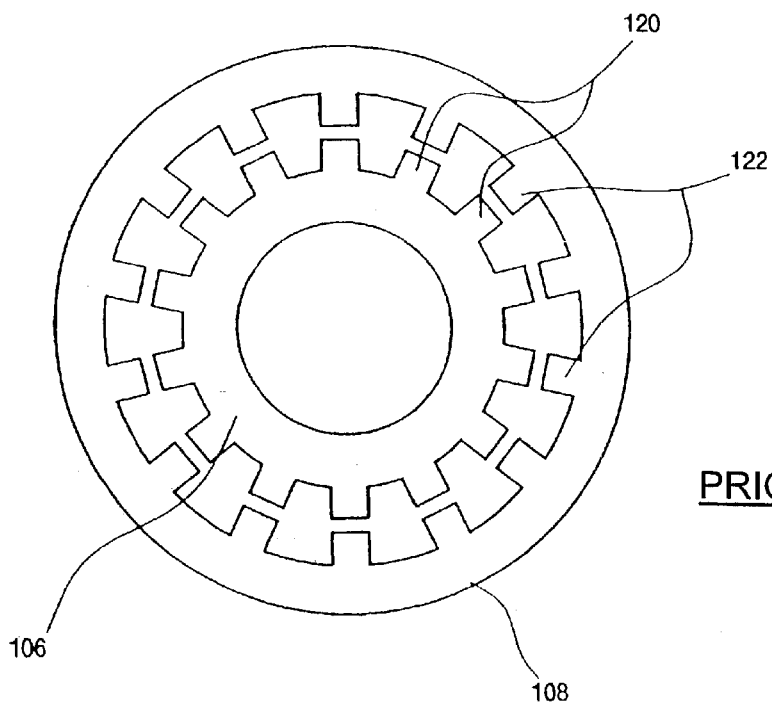
FIGS. 5A and 5B are a plan view and a plan exploded view illustrating a toothed portion formed in a pair of rotational hard members of a conventional repelling apparatus.
Figure 5B:
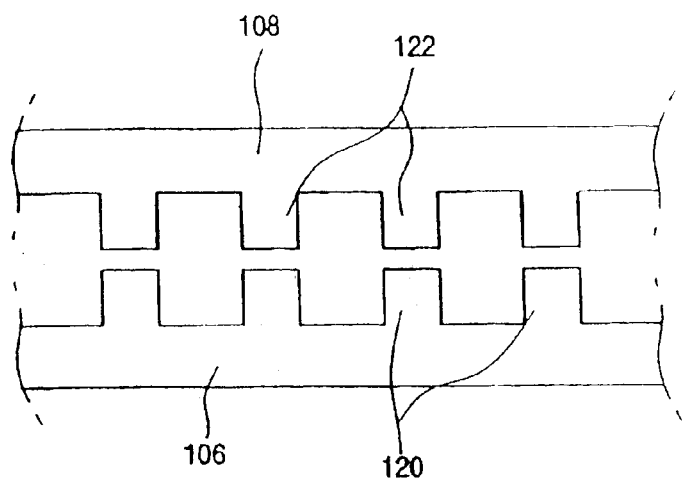
Figure 6:
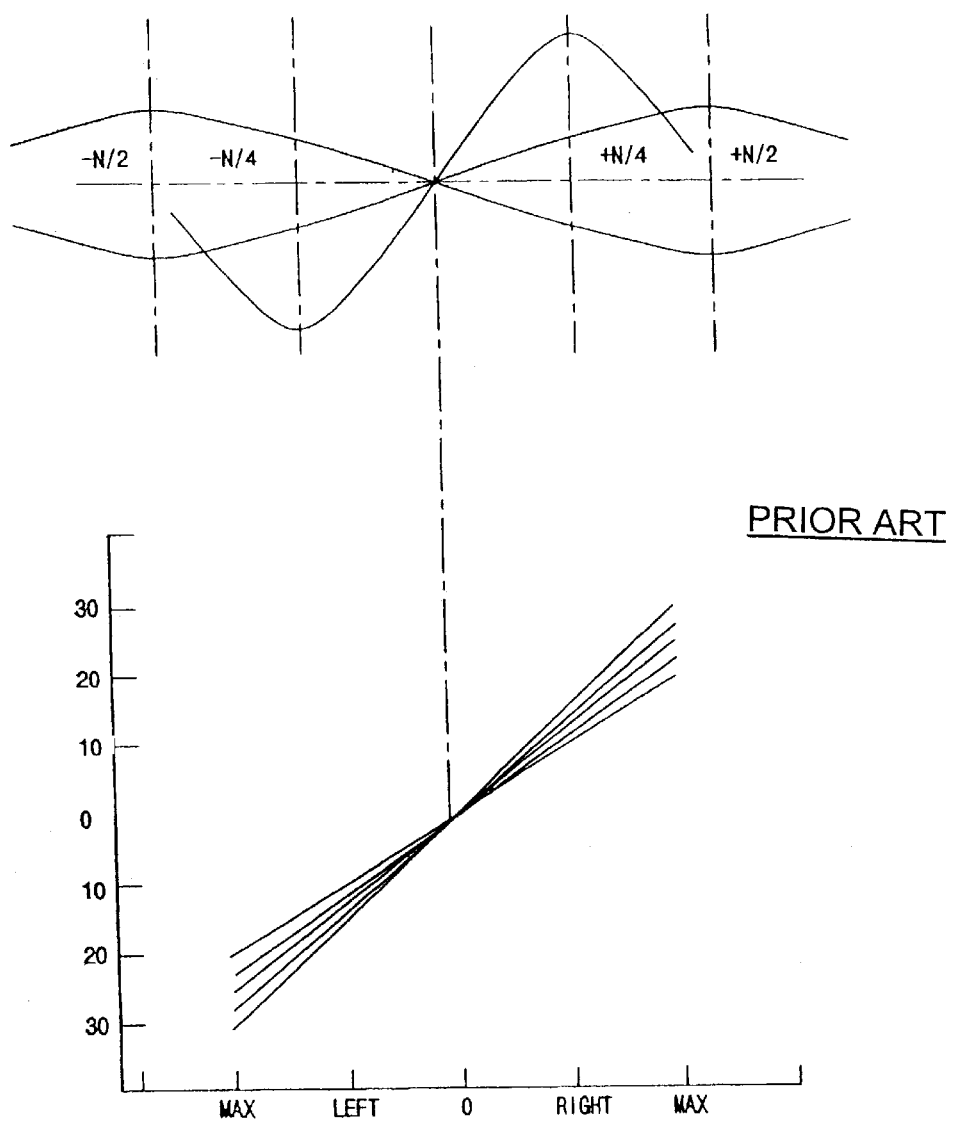
FIG. 6 is a view illustrating a characteristic of a torsion bar with respect to a variation of an operational force based on a magnetic force in a conventional repelling force apparatus.
Figure 7:
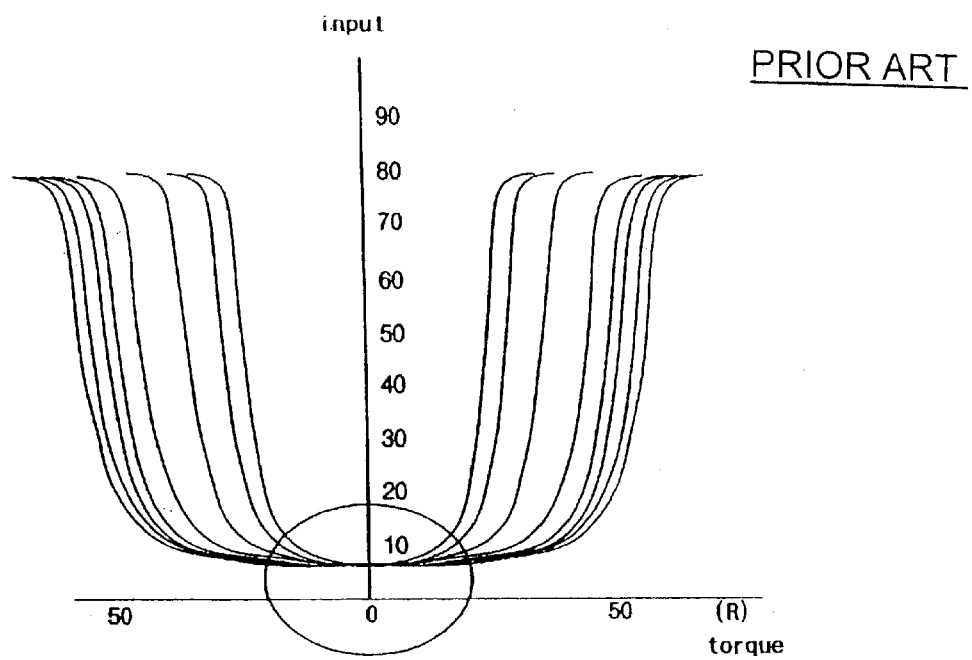
FIG. 7 is a graph of a state that there is a non-sensitive portion in a characteristic of a conventional valve.
Figure 8:
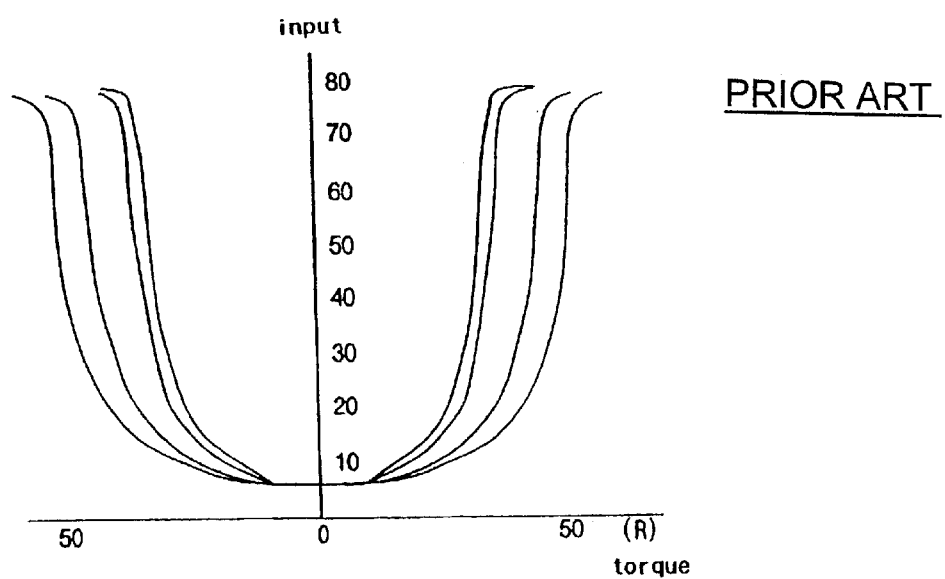
FIG. 8 is a graph of a state that there is a sensitive portion in a characteristic of a conventional valve.
Figure 9:
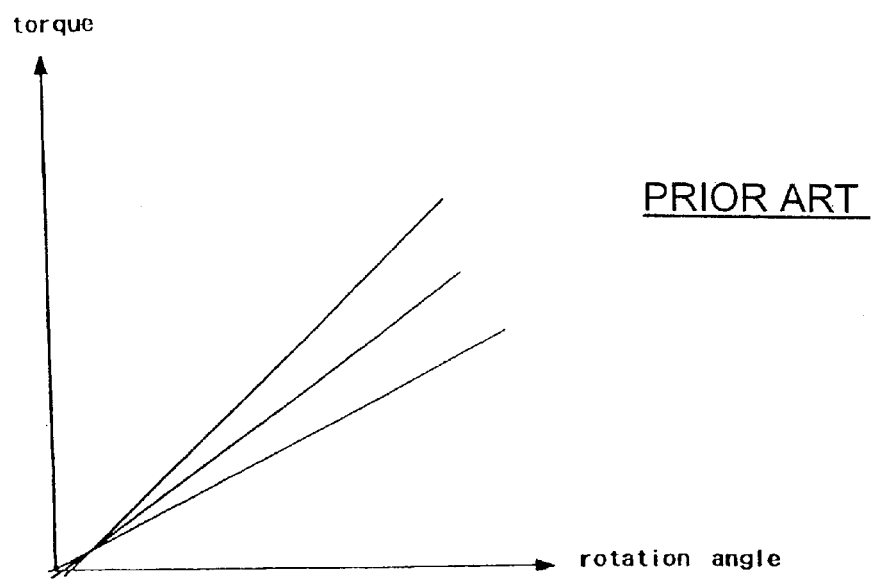
FIG. 9 is a view illustrating a variation of a torque with respect to a rotational angle in a conventional art.
Figure 10A:
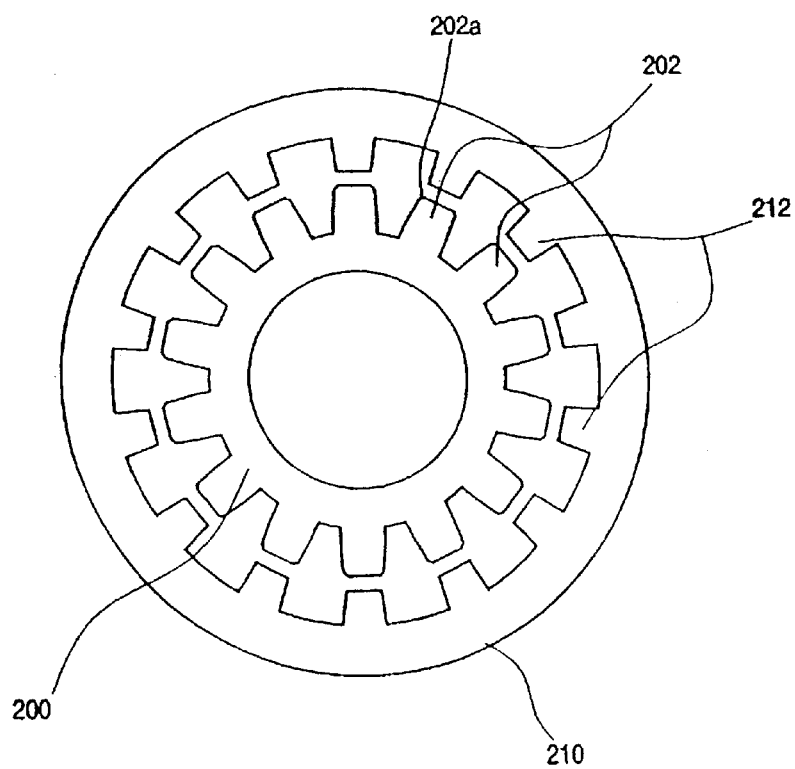
FIGS. 10A and 10B are a plan view and a plan exploded view illustrating a toothed portion formed in a pair of rotational hard members in a repelling force apparatus according to an embodiment of the present invention.
Figure 10B:
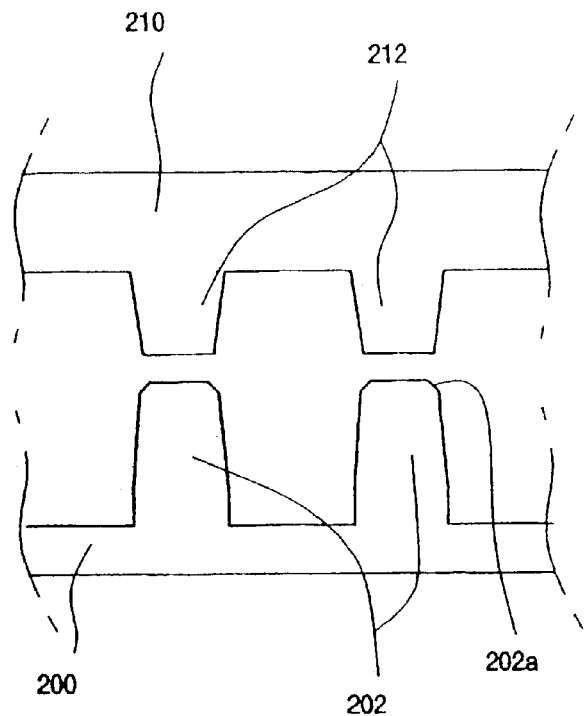

FIGS. 10A and 10B are a plan view and a plan exploded view illustrating a toothed portion formed in a pair of rotational hard members in a repelling force apparatus according to an embodiment of the present invention. As shown therein, trapezoid shape teeth 202 and 212 are formed in pair of cylindrical ferromagnetic members 200 and 210 to be opposite each other, and a taper 202a is formed at both sides of the trapezoid shape tooth 202. More specifically, inner ferromagnetic member 200 is formed with outwardly extending teeth 202 having a trapezoidal shape tapering outwardly, while outer ferromagnetic member 210 is provided with inwardly extending teeth 212 having a trapezoidal shape tapering inwardly. Taper 202a is an additional, steeper taper formed by beveling opposing edges of each tooth 202.

Figure 11:
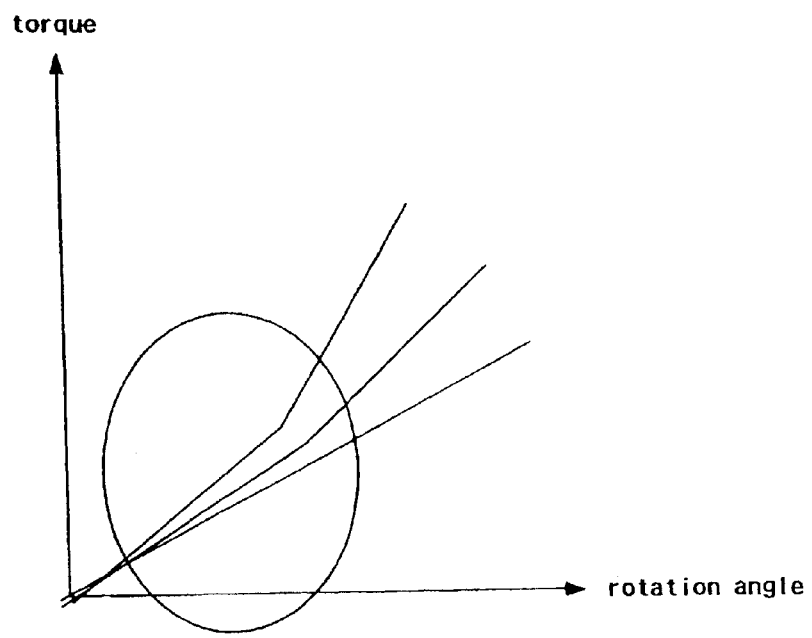
FIG. 11 is a view illustrating a variation of a torque with respect to a rotational angle of a steeling handle according to the present invention.

As shown in FIG. 11, in the repelling force apparatus according to the present invention, when rotating the steering handle, the torque is varied. In the case that there is a non-sensitive portion in the characteristic of the valve, the torque is increased by the minimized slope.

Figure 12A:
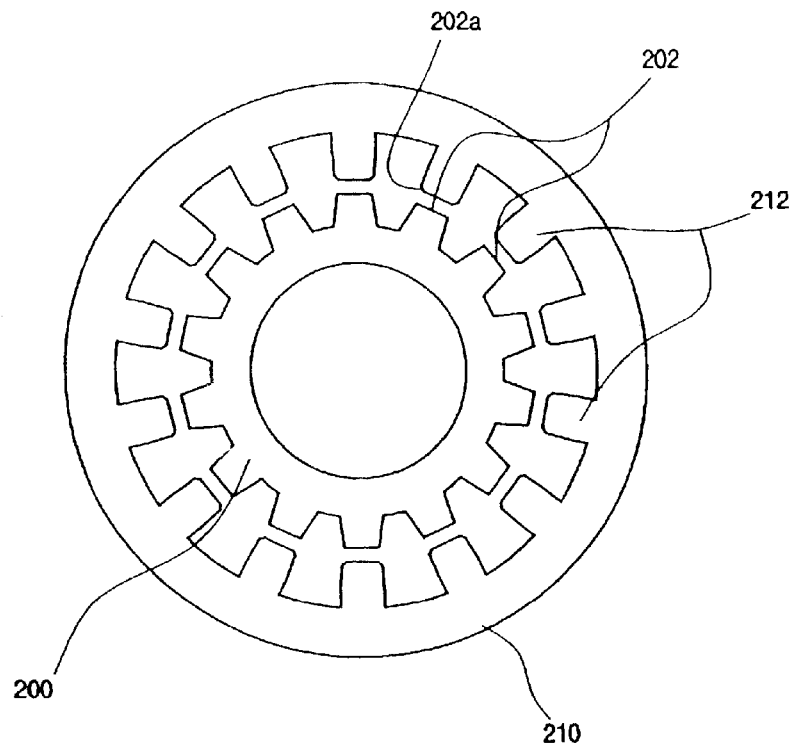
FIGS. 12A and 12B are a plan view and a plan exploded view illustrating a toothed portion formed in a pair of rotational hard members in a repelling force apparatus according to another embodiment of the present invention.
Figure 12B:
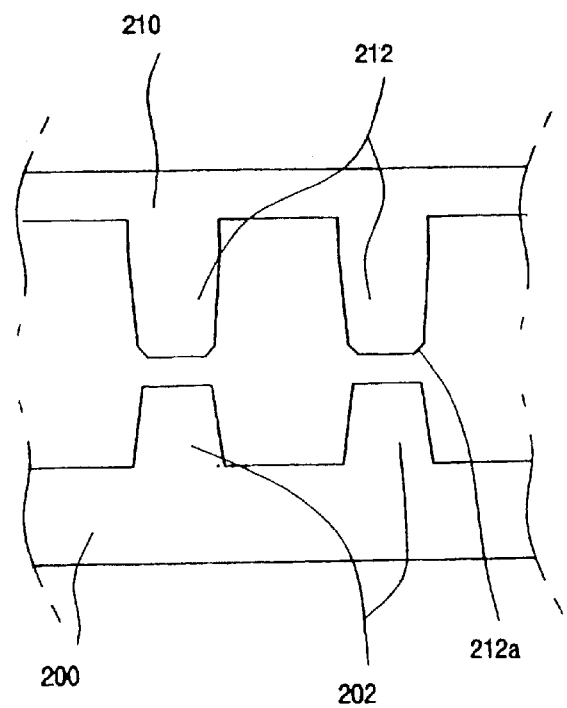
Figure 13A:
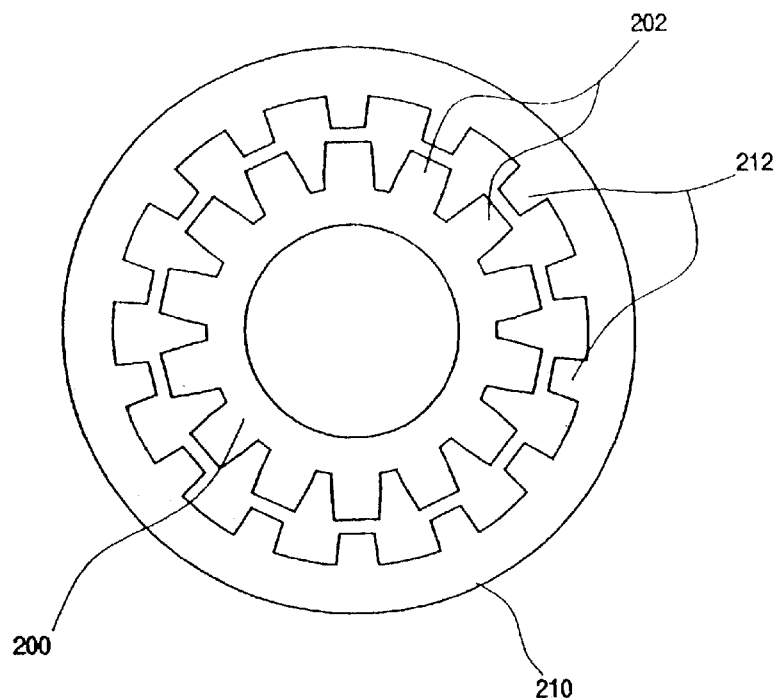
FIGS. 13A and 13B are a plan view and a plan exploded view illustrating a toothed-portion formed in a pair of rotational hard members in a repelling force apparatus according to still another embodiment of the present invention.
Figure 13B:
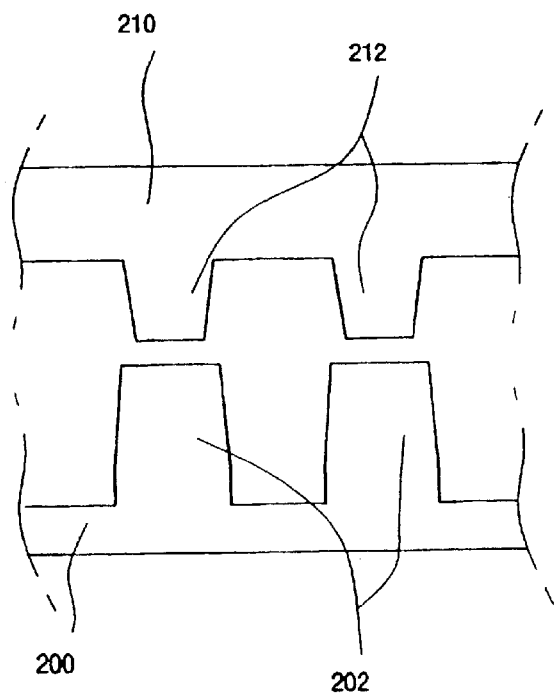
Figure 14A:
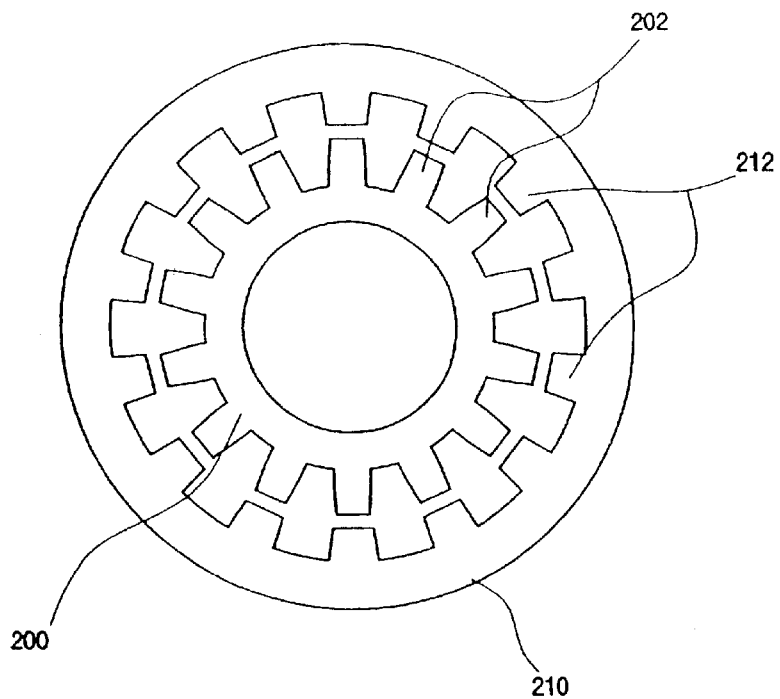
FIGS. 14A and 14B are a plan view and a plan exploded view illustrating a toothed-portion formed in a pair of rotational hard members in a repelling force apparatus according to further still another embodiment of the present invention.
Figure 14B:
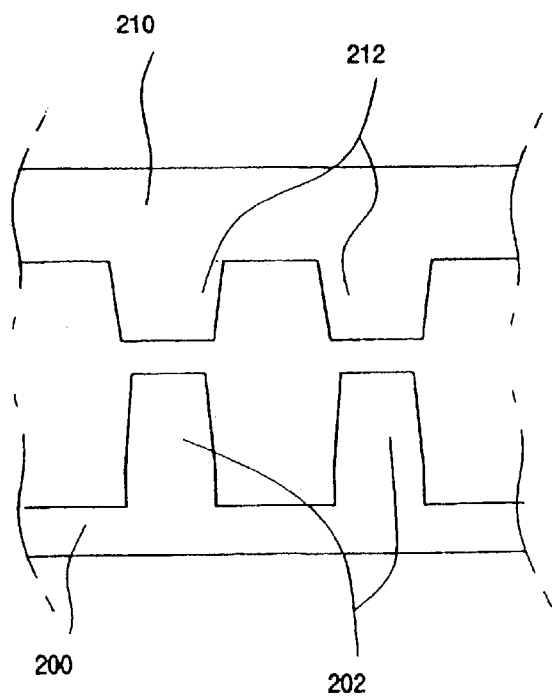

As shown in FIGS. 12A and 12B, the taper 202a is not formed at both sides of the trapezoid shape tooth 202 of the cylindrical rotational ferromagnetic member 200, and a taper 212a is formed at both sides of the trapezoid shape tooth 212 of the cylindrical rotational ferromagnetic member 210.

In addition, in the present invention, the tapers 202a and 212a are not formed in the trapezoid shape teeth 202 and 212 to be opposite each other in the cylindrical rotational ferromagnetic members 200 and 210. As shown in FIGS. 13A, 13B and 14A, 14B, the sizes of the opposite surfaces of the trapezoid shape teeth 202 and 212 may be different.

FIGS. 15A through 15E are exploded views illustrating the trapezoid shape teeth 202 and 212 formed in the cylindrical rotational ferromagnetic members 200 and 210 in the repelling apparatus according to the present invention.

Figure 15A:
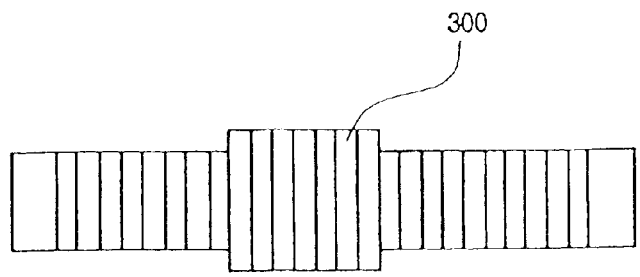
FIGS. 15A and 15E are plan exploded views illustrating a toothed-portion formed in a pair of rotational hard members in a repelling force apparatus according to still another embodiment of the present invention.
Figure 15B:
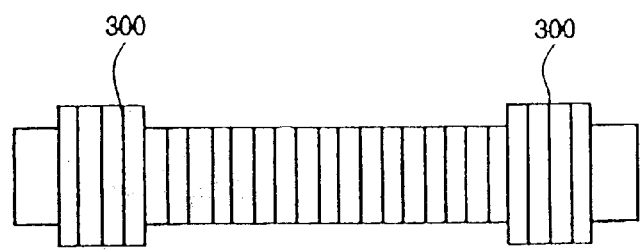
Figure 15C:
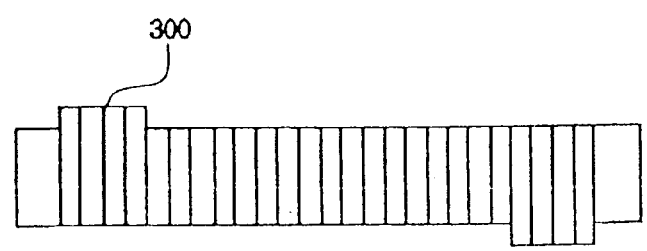
Figure 15D:
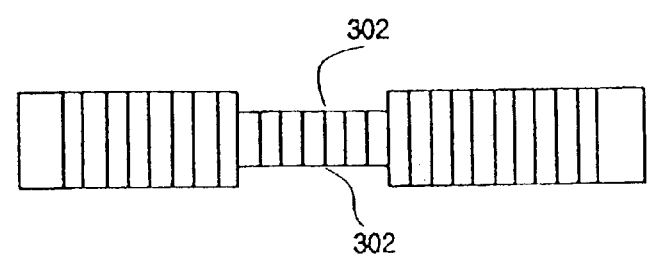
Figure 15E:
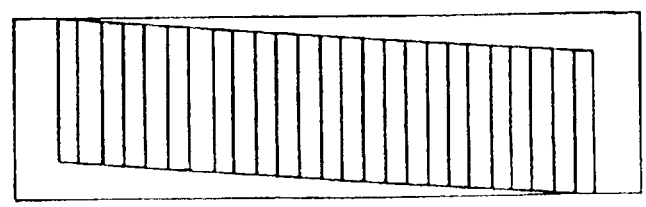

In FIG. 15A, a certain number of the trapezoid shape teeth 202 and 212 is extended for thereby forming a protrusion 300 at both sides, and in FIG. 16B, a certain number of the teeth 202 and 212 formed at certain two portions among the teeth 202 and 212 is extended for thereby forming a protrusion 300 at both sides, and in FIG. 13C, a certain number of teeth 202 and 212 formed at certain two portions among the teeth 202 and 212 are extended in the opposite direction for thereby forming a protrusion 300 at both sides, and in FIG. 13D, a certain number of teeth 202 and 212 are formed in short at a certain portion among the teeth 202 and 212 for thereby forming a groove 302 at both sides, and in FIG. 15E, the teeth 202 and 212 are formed in a slanted shape. Therefore, it is possible to increase the torque by the minimized slope in the case that there is a non-sensitive portion in the characteristic of the valve as the torque is varied when rotating the steering handle.

As described above, it is possible to increase by the minimized slope even when there is a non-sensitive portion in the characteristic of the valve so that the characteristic of the torque is varied based on a linear and/or non-linear characteristic in accordance with a rotation of the steering handle.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a repelling force apparatus of a power steering system for a vehicle, having a plurality of teeth which are opposite each other in a pair of rotational ferromagnetic members including an inner ferromagnetic member having a plurality of inner teeth and an outer ferromagnetic member having a plurality of outer teeth, said inner teeth being opposite respective ones of said outer teeth, wherein there are provided an exciting coil, a permanent magnet and said pair of rotational ferromagnetic members, said inner teeth and said outer teeth having opposite facing surfaces, the opposite surfaces of said inner teeth facing the opposite facing surfaces of the respective ones of said outer teeth, the improvement wherein:

(a) said inner teeth have a trapezoid shape; and
  (b) the opposite facing surfaces of said inner teeth are different in size from the opposite facing surfaces of the respective ones of said outer teeth.

2. The apparatus of claim 1, wherein a taper is formed at both sides of each of said inner teeth, so that the sizes of the opposite surfaces of said inner teeth and said outer teeth are different.

3. A repelling force apparatus of a power steering system for a vehicle, said apparatus comprising:

an exciting coil;
  a permanent magnet; and
  a pair of rotational ferromagnetic members including an inner member having a plurality of outwardly extending teeth and an outer member having a plurality of inwardly extending teeth, said outwardly extending teeth being radially aligned with respective ones of said inwardly extending teeth, said outwardly extending teeth and said inwardly extending teeth being formed in a trapezoidal shape, said outwardly extending teeth and said inwardly extending teeth having opposing facing surfaces of different sizes, wherein the opposing facing surfaces of said outwardly extending teeth face radially outwardly and the opposing facing surfaces of said inwardly extending teeth face radially inwardly so that the opposing facing surfaces of said outwardly extending teeth face the opposing facing surfaces of respective ones of said inwardly extending teeth.

4. The apparatus of claim 3, wherein a taper is formed along opposite edges of the teeth of one of said inner member and said outer member, whereby said opposing surfaces of said outwardly extending teeth and said inwardly extending teeth are of different sizes.

5. The apparatus of claim 4, wherein said taper is formed along opposite edges of said outwardly extending teeth.

6. The apparatus of claim 3, wherein said outwardly extending teeth each have a radially inner side and a radially outer side, said radially outer side being smaller than said radially inner side.

7. A repelling force apparatus of a power steering system for a vehicle, said apparatus comprising:

an exciting coil;
  a permanent magnet; and
  a pair of rotational ferromagnetic members including an inner member having a plurality of outwardly extending teeth and an outer member having a plurality of inwardly extending teeth, said outwardly extending teeth being radially aligned with respective ones of said inwardly extending teeth, said outwardly extending teeth having a trapezoidal shape tapering outwardly, said inwardly extending teeth having a trapezoidal shape tapering inwardly, said outwardly extending teeth and said inwardly extending teeth having opposing facing surfaces of different sizes, wherein the opposing facing surfaces of said outwardly extending teeth face radially outwardly and the opposing facing surfaces of said inwardly extending teeth face radially inwardly so that the opposing facing surfaces of said outwardly extending teeth face the opposing facing surfaces of respective ones of said inwardly extending teeth.

8. The apparatus of claim 7, wherein an additional taper is formed along opposite edges of the teeth of one of said inner member and said outer member, whereby said opposing surfaces of said outwardly extending teeth and said inwardly extending teeth are of different sizes.

9. The apparatus of claim 8, wherein said additional taper is formed along opposite edges of said outwardly extending teeth.

* * * * *